United States Patent [19]

Reiter

[11] 3,894,730
[45] July 15, 1975

[54] BEAM CLAMP
[75] Inventor: Robert F. Reiter, Freeport, Ill.
[73] Assignee: W. A. Whitney Corporation, Rockford, Ill.
[22] Filed: Mar. 7, 1974
[21] Appl. No.: 448,927

[52] U.S. Cl. .................. 269/13; 83/459; 269/23; 269/285; 269/316
[51] Int. Cl. ............................................. B25b 1/18
[58] Field of Search ........ 269/13, 14, 285, 298–306, 269/316–320, 321 CF, 321 ME, 23, 25; 83/732, 409, 418–421, 412–414, 446, 447, 460, 461, 466, 459; 198/127 R, 137

[56] References Cited
UNITED STATES PATENTS

| | | | |
|---|---|---|---|
| 2,722,247 | 11/1955 | Schroeder et al. | 83/446 |
| 3,552,254 | 1/1971 | Marczy | 269/304 X |
| 3,577,829 | 5/1971 | Hurn et al. | 83/409 X |
| 3,776,537 | 12/1973 | Smith et al. | 269/13 |
| 3,802,687 | 4/1974 | Bredow | 269/285 X |

Primary Examiner—Roy Lake
Assistant Examiner—Neil Abrams
Attorney, Agent, or Firm—Wolfe, Hubbard, Leydig, Voit & Osann, Ltd.

[57] ABSTRACT

A clamp for holding a beam against a gage for the performance of a punching operation is positioned between the rollers of a conveyor and includes a jaw normally projecting upwardly between adjacent rollers and beyond the tops of the rollers. The jaw is mounted on a collar telescoped onto a reciprocable rod extending across the conveyor and is urged into an upright position by a torsion spring acting between the collar and the jaw. When the rod is shifted, the jaw clamps the beam against the gage. Should the jaw be hit by the beam as the latter is advanced along the conveyor prior to clamping, the spring yields and allows the jaws to pivot beneath the tops of the rollers so as to keep the jaw from being broken loose from the collar.

7 Claims, 5 Drawing Figures

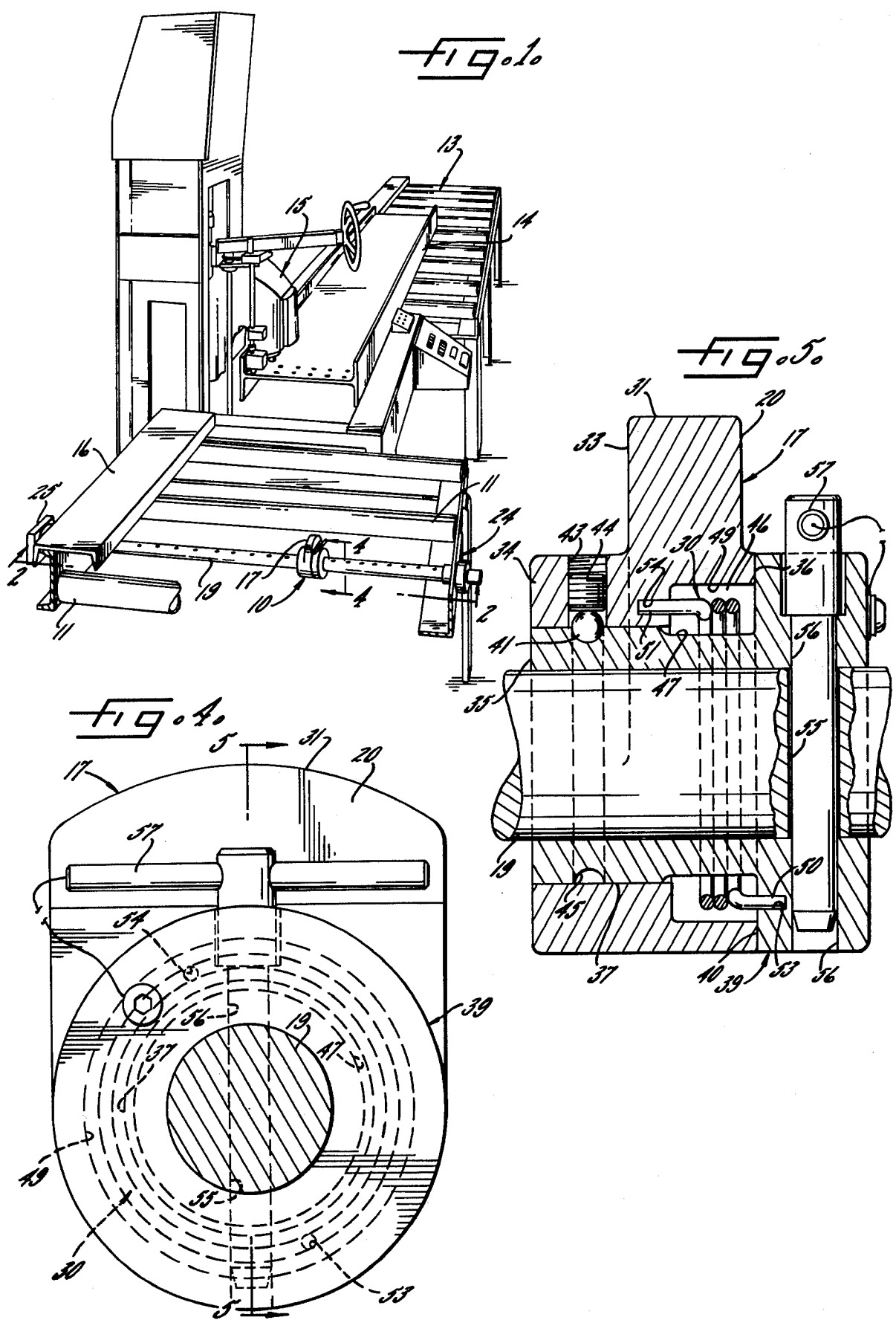

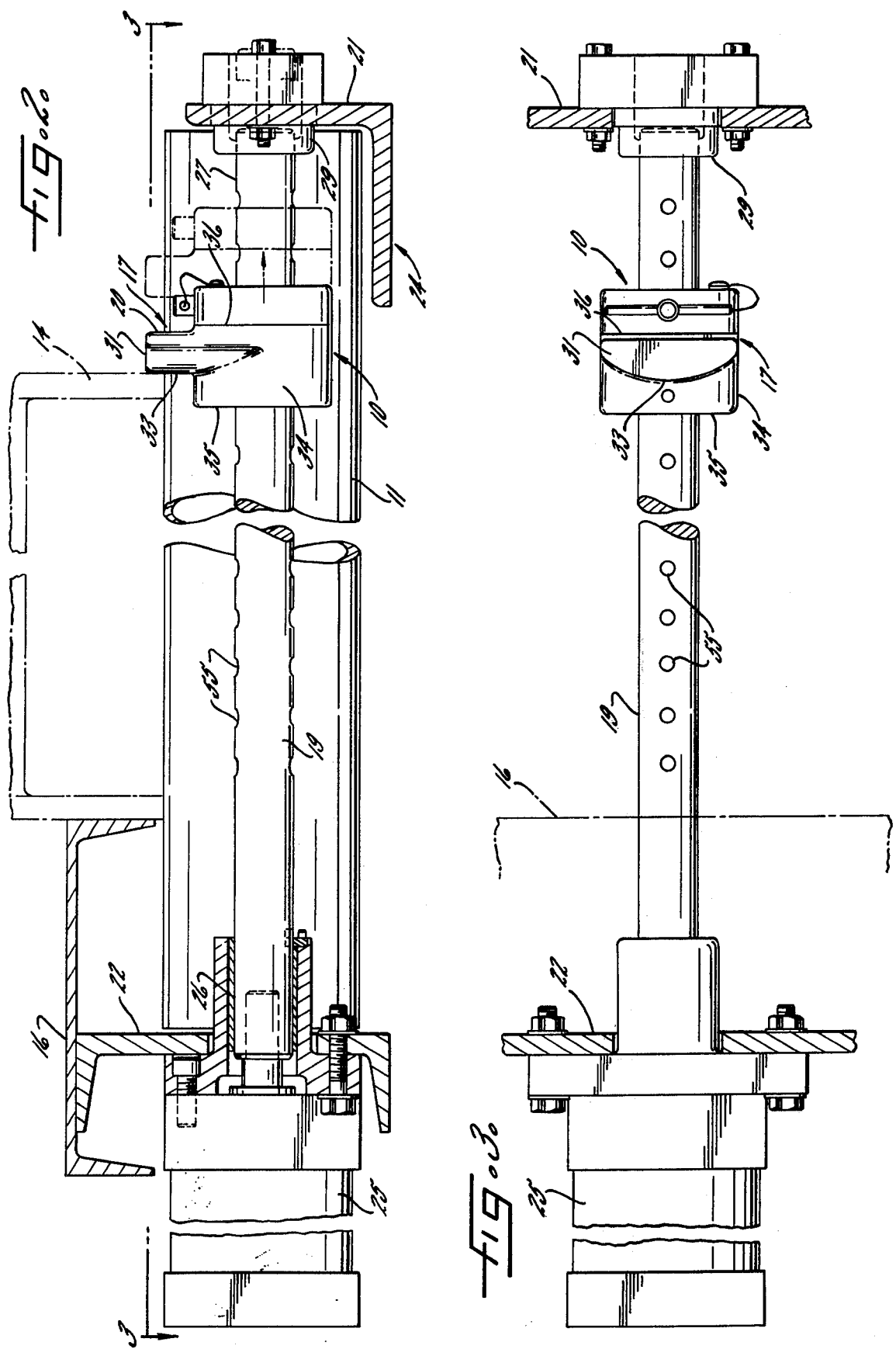

3,894,730

BEAM CLAMP

BACKGROUND OF THE INVENTION

This invention relates to a clamp used to hold an elongated workpiece such as a steel beam against a gage while an operation such as punching is performed on the workpiece. Typically, the clamp is mounted on a reciprocable rod extending between the rollers of a conveyor carrying the workpiece. The clamp includes a jaw which projects upwardly between the rollers so that, when the rod is shifted, the jaw engages the side of the workpiece and clamps the workpiece against an elongated gage extending parallel to the conveyor. In this way, the workpiece is located accurately relative to a machine tool such as a punch press and thus holes may be punched in the workpiece in the positions desired.

SUMMARY OF THE INVENTION

The primary object of the present invention is to provide a new and improved clamp of the foregoing general character which is protected from being broken when accidentally hit by a workpiece as the latter is being advanced along the conveyor. A more detailed object is to achieve the foregoing by mounting the jaw on the rod with a spring acting between the jaw and the rod to urge the jaw into an upright position so that, when the jaw is hit by the workpiece, the spring will yield and permit the jaw to pivot beneath the tops of the rollers without being broken loose from the rod.

The invention also resides in the novel construction of the clamp so that the jaw pivots beneath the tops of the rollers when hit by the workpiece from either direction as the latter is moved along the conveyor.

These and other objects and advantages of the present invention will become more apparent from the following detailed description when taken in conjunction with the accompanying drawings.

BRIEF DESCRIPTION OF THE DRAWINGS

FIG. 1 is a fragmentary perspective view of a punch press and conveyor provided with a clamp embodying the novel features of the present invention.

FIG. 2 is an enlarged fragmentary cross-section taken substantially along line 2—2 of FIG. 1.

FIG. 3 is a fragmentary cross section taken substantially along line 3—3 of FIG. 2.

FIG. 4 is an enlarged cross section taken substantially along line 4—4 of FIG. 1.

FIG. 5 is a fragmentary cross section taken substantially along line 5—5 of FIG. 4.

DETAILED DESCRIPTION OF THE PREFERRED EMBODIMENT

As shown in the drawings for purposes of illustration, the invention is embodied in a clamp 10 mounted between the rollers 11 of a conveyor 13 used to transport an elongated workpiece 14 such as a steel beam to and from a punch press 15. The clamp is used to hold the workpiece against a back gage 16 and thereby position the beam accurately during punching. Herein, the clamp comprises a jaw 17 (see FIG. 2) mounted on a reciprocable rod 19 and having a free end portion 20 projecting upwardly beyond the tops of the rollers for engagement with the workpiece to clamp the latter against the gage. The rod extends between the opposite sides 21 and 22 of a frame 24 supporting the rollers and is reciprocated between advanced and retracted positions by actuation of a cylinder 25. The latter is supported on the side 22 of the frame with the inner end 26 of the rod being connected to the piston (not shown) within the cylinder. The outer end portion 27 of the rod is mounted slidably within a boss 29 secured to the side 21 of the frame and serving to support and guide the rod as the latter is retracted and advanced to clamp and release the workpiece.

Occasionally, when being carried along by the conveyor 13, the workpiece 14 may become skewed with respect to the gage 16 and may hit the jaw 17. In accordance with the primary aspect of the present invention, the jaw 17 of the clamp 10 is kept from being broken loose from the rod 19 when hit by the workpiece. For this purpose, spring means 30 (FIG. 5) acting between the jaw and the rod urges the jaw into an upright position for clamping the workpiece against the gage but permits the jaw to be pivoted beneath the rollers 11 when hit from either direction by the workpiece so that the jaw will not be broken loose from the rod. Advantageously, this arrangement virtually eliminates downtime of the punch press 15 resulting from the necessity to repair clamps of the type which may be broken when hit by the workpiece.

In the present instance, the free end portion 20 of the jaw 17 includes an upwardly curved top end 31 and a normally vertical clamping face 33 which is curved convexly toward the gage 16 as is shown in FIG. 3 to facilitate clamping of the workpiece 14 against the gage. The lower end portion 34 of the jaw is generally cylindrical in shape with opposite end sections 35 and 36 thereof projecting beyond the opposing faces of the free end portion of the jaw. Herein, the lower end portion is telescoped over the inner end portion 37 of a collar 39 and into abutment with an enlarged shoulder 40 forming the outer end portion of the collar. To hold the jaw on the collar against axial separation while still permitting the jaw to pivot on the collar, a ball 41 (see FIG. 5) is held within a hole 43 in the lower portion of the jaw by a set screw 44. The ball rides within a race 45 formed around the inner end 37 of the collar and thus axially captivates the jaw on the collar while permitting relative pivoting between the two.

As shown in FIG. 5, the spring means 30 is in the form of a coiled torsion spring housed within an annular space 46 located between the collar 39 and the jaw 17. The space is defined by an annular recess 47 formed in the periphery of the inner end portion 37 of the collar adjacent the shoulder 40 and a corresponding recess 49 formed in the lower portion of the jaw. The latter recess is concentric with and overlies the recess 47 so that the space 46 is completely enclosed by the jaw. Opposite ends 50 and 51 of the spring 30 are fixed to the shoulder and the jaw, respectively, with the outer end 50 of the spring being secured within a hole 53 in the shoulder and with the inner end 51 of the spring being secured within a similar hole 54 in the lower portion 34 of the jaw. In its relaxed condition, the spring advantageously holds the jaw so that the free end portion 20 thereof projects upwardly beyond the tops of the rollers 11 for clamping engagement with the workpiece 14. When the free end portion of the arm is hit by the workpiece from either direction along the conveyor, the jaw will simply pivot on the collar and swing beneath the rollers without being broken loose from the collar or the rod. The spring will, of course, automatically return the jaw to its upright position once the workpiece has cleared the jaw.

In order to facilitate use of the clamp 10 for different widths of workpieces 14, provision is made of means for fixing the collar 39 in spaced axial positions along the rod 19. Herein, a plurality of axially spaced diametrical holes 55 are formed vertically through the rod and a diametrical opening 56 is formed vertically through the shoulder 40. In use, the collar is slid along the rod until the opening aligns with the hole at the position desired and a T-pin 57 is telescoped through the aligned opening and hole to hold the collar in position. By virtue of this arrangement, the clamp may be adjusted easily for use with different widths of workpieces while still using a cylinder 25 having a short stroke.

Thus, it will be apparent from the foregoing that the novel clamp 10 of the present invention is kept from being broken when hit by the workpiece 14 as the latter is being carried along the conveyor 13. Moreover, the clamp is of simple and inexpensive construction while still being selectively movable along the rod 19 to accommodate different widths of workpieces.

I claim as my invention:

1. A clamp for positioning an elongated workpiece carried by a roller conveyor against a gage extending along one side of the conveyor to hold the workpiece during the performance of an operation on the workpiece, said clamp including a jaw mounted between the rollers of the conveyor to pivot in a generally longitudinal direction with respect to said conveyor and having a free end portion normally projecting upwardly beyond the tops of the rollers, means for moving said jaw in a generally lateral direction with respect to said conveyor to clamp and release the workpiece with respect to the gage, and a spring connected between said jaw and said means and holding said jaw in an upright position while allowing the jaw to be pivoted beneath the rollers without breaking loose from said means when the jaw is hit by the workpiece as the latter is moved along the conveyor.

2. A clamp for positioning an elongated workpiece carried by a roller conveyor against a gage extending along one side of the conveyor to hold the workpiece during the performance of an operation on the workpiece, said clamp including a reciprocable rod mounted on and extending in a generally lateral direction across said conveyor below the tops of the rollers of the conveyor, means for reciprocating said rod laterally of said conveyor between advanced and retracted positions, a jaw attached to said rod to pivot in a generally longitudinal direction with respect to said conveyor and for bodily movement with said rod, said jaw normally being positioned with a free end portion thereof extending upwardly beyond the tops of the rollers to clamp and release the workpiece with respect to the gage as the rod is moved between its positions, and spring means acting between said jaw and said rod and holding said jaw in an upright position while allowing said jaw to be pivoted beneath the tops of the rollers without breaking loose from said rod when the jaw is hit by the workpiece as the latter is moved along the conveyor.

3. A clamp as defined by claim 2 including a generally cylindrical collar telescoped onto said rod and being movable between selected axial positions along said rod, means for fixing said collar on said rod in said axial positions for bodily movement with said rod, said jaw being pivotally mounted and axially captivated on said collar, said spring means being connected between said collar and said jaw.

4. A clamp as defined by claim 3 wherein said collar includes a generally cylindrical inner end portion thereof, said jaw having a generally cylindrical lower end portion telescoped onto said inner end portion and abutting said shoulder.

5. A clamp as defined by claim 4 wherein said spring means comprises a torsion spring telescoped over the inner end portion of said collar within an annular space formed between the collar and the jaw, said spring having one end fixed to said shoulder and another end fixed to said jaw.

6. A clamp as defined by claim 5 including a ball race formed in said collar adjacent the inner end thereof, a hole formed in the cylindrical section of said jaw in alignment with said race, and a ball captivated within said hole and protruding into said race to hold said jaw on said collar.

7. A clamp for positioning an elongated workpiece carried by a roller conveyor against a gage extending along one side of the conveyor to hold the workpiece during the performance of an operation on the workpiece, said clamp including a rod mounted on and extending laterally across the conveyor below the tops of the rollers in the conveyor, means for reciprocating said rod axially between advanced and retracted positions, a collar telescoped onto said rod and being movable to selected axial positions along said rod, means for fixing said collar on said rod in a selected axial position for bodily movement with said rod, a jaw pivotally mounted and axially captivated on said collar with the free end portion of the jaw normally projecting upwardly beyond the tops of the rollers for engagement with the workpiece to clamp the latter against the gage when the rod is moved, and spring means connected between said jaw and said collar and holding said jaw in an upright position while allowing the jaw to be pivoted beneath the rollers without breaking loose from said collar when the jaw is hit by the workpiece as the latter is moved along the conveyor.

* * * * *